(12) United States Patent
Nitzpon

(10) Patent No.: US 7,866,946 B2
(45) Date of Patent: Jan. 11, 2011

(54) METHOD FOR OPERATING A DEVICE TO VARY A BLADE SETTING ANGLE, AND A VARYING DEVICE

(75) Inventor: Joachim Nitzpon, Hamburg (DE)

(73) Assignee: Nordex Energy GmbH, Norderstedt (DE)

( * ) Notice: Subject to any disclaimer, the term of this patent is extended or adjusted under 35 U.S.C. 154(b) by 807 days.

(21) Appl. No.: 11/575,819

(22) PCT Filed: Sep. 19, 2005

(86) PCT No.: PCT/EP2005/010089

§ 371 (c)(1),
(2), (4) Date: Mar. 22, 2007

(87) PCT Pub. No.: WO2006/032438

PCT Pub. Date: Mar. 30, 2006

(65) Prior Publication Data

US 2007/0231137 A1      Oct. 4, 2007

(30) Foreign Application Priority Data

Sep. 23, 2004   (DE) .................. 10 2004 046 260

(51) Int. Cl.
*F03D 7/02* (2006.01)

(52) U.S. Cl. .............................. 416/1; 416/31; 416/155
(58) Field of Classification Search .................. 416/47, 416/48, 155, 158, 156
See application file for complete search history.

(56) References Cited

U.S. PATENT DOCUMENTS

| 2002/0047275 | A1 | 4/2002 | Wobben ........................ 290/55 |
| 2003/0075929 | A1* | 4/2003 | Weitkamp ..................... 290/55 |
| 2003/0116970 | A1* | 6/2003 | Weitkamp et al. ............. 290/44 |
| 2004/0240997 | A1* | 12/2004 | Wobben .................. 416/132 B |

FOREIGN PATENT DOCUMENTS

| DE | 196 34 059 C1 | 10/1997 |
| DE | 100 44 262 A1 | 3/2002 |
| DE | 101 40 793 A1 | 3/2003 |

\* cited by examiner

*Primary Examiner*—Richard Edgar
(74) *Attorney, Agent, or Firm*—Vidas, Arrett & Steinkraus

(57) ABSTRACT

A method for operating a device to vary a blade setting angle on a rotor blade of a wind power plant, comprising two variable drives each per rotor blade, a bearing element acting between the rotor blade and rotor hub which has a freely rotatable bearing ring, wherein the method has the following process steps: setting the bearing ring into a permanent rotation by a first drive, and adjusting the setting angle of the rotor blade by a second drive.

17 Claims, 3 Drawing Sheets

METHOD FOR OPERATING A DEVICE TO VARY A BLADE SETTING ANGLE, AND A VARYING DEVICE

CROSS-REFERENCE TO RELATED APPLICATIONS

Not applicable

STATEMENT REGARDING FEDERALLY SPONSORED RESEARCH

Not applicable

BACKGROUND OF THE INVENTION

The present invention relates to a method for operating a device to vary a blade setting angle, and a varying device as such.

Larger-sized wind power plants have a blade setting angle controller on the rotors. It adjusts a setting angle of the rotor blade to control the power and speed of the rotor. As a rule, setting ranges having a span of from 20° to 25° are employed here. The secondary function of the blade setting angle controller consists in bringing a rotor to a stop. To this end, the rotor blades are rotated up to a so-called feathering position at which a torque is no longer generated. This requires a setting range of about 90°.

A device for varying the rotor blade of a rotor on a wind power plant has become known from DE 101 40 793 A1, the entire contents of which is incorporated herein by reference. Here, the rotor blade is rotatably supported by a rotor hub via an antifriction bearing. The antifriction bearing has three bearing rings with two raceways two radially outer rings of which are joined to the rotor hub and a so-called tubular extender and a third ring runs internally with respect to the outer rings in a first aspect. The variation of the rotor blade and extender with respect to the rotor hub is provided by two variable drives one of which adjusts the angular position of the non-joined ring with respect to the rotor hub while the second drive adjusts the angular position of the rotor blade with respect to the non-joined ring. For a movement of the rotor blade to the desired angular position, the two drive systems are triggered, i.e. each of the drives runs at a predetermined variation rate for a time until the rotor blade has taken the desired angular position. To obtain a lubricant spread as uniform as possible inside the antifriction bearing during the variation of the blade setting angle we propose to operate both of the variable drives in opposed senses until the desired angular position is reached.

Using an antifriction bearing for the system for varying the blade setting angles, which technically is also referred to as a pitch system, has the disadvantage that it is necessary to overcome a breakaway torque of the antifriction bearing. The higher the wind speed is and, hence, the moments of strike and swivel from the rotor blade act onto the bearing the larger is the breakaway torque required to adjust the rotor blade. The breakaway torque occurs if a rotation starts from stoppage or if the rotational speed is lower than a critical speed which is close to zero. The critical rotational speed depends upon the configuration of the bearing and may be explained by a slip-stick effect between the antifriction bearing and the raceway. The slip-stick effect substantially is a transition from friction at rest to rolling friction on the bearing.

Since the breakaway torque in an antifriction bearing for varying the rotor blade position, due to its construction, distinctly is higher than are the driving torques necessary for the variation process the breakaway torque plays an important role in designing pitch drives.

It is the object of the invention to provide a method for adjusting the blade setting angle for a pitch system, and a device for varying a blade setting angle, which apply a much more uniform load to the bearings and tooth system on the rotary joint and avoid, or at least greatly reduce, stoppage marks in the bearing, and which can be designed to have a lower power output for the variable drives.

BRIEF DESCRIPTION OF THE DRAWINGS

The inventive method for operating a device to vary a blade setting angle on a rotor of a wind power plant works with two independent variable drives, A bearing element functions between the rotor blade and rotor hub so as to make the rotor blade rotatable about its longitudinal axis. The bearing element has a freely rotatable bearing ring. The inventive method operates with a first drive which sets the bearing ring into a permanent rotation. Unlike in the triggering method of the state of the art, the motion of the rotor blade is not shared by two drives here, but the angle is adjusted by a second drive with the bearing ring rotating continuously.

The advantage of the inventive method is that breakaway torques do not occur any longer for the bearing ring at an appropriate speed and, thus, it becomes possible to reduce the required power of the variable drives. What adds to this is that the continuous rotation of the bearing ring efficiently helps avoid stoppage marks and the tooth system of the rotary bearing ring is evenly acted on by the load across the circumference.

Figure 1:
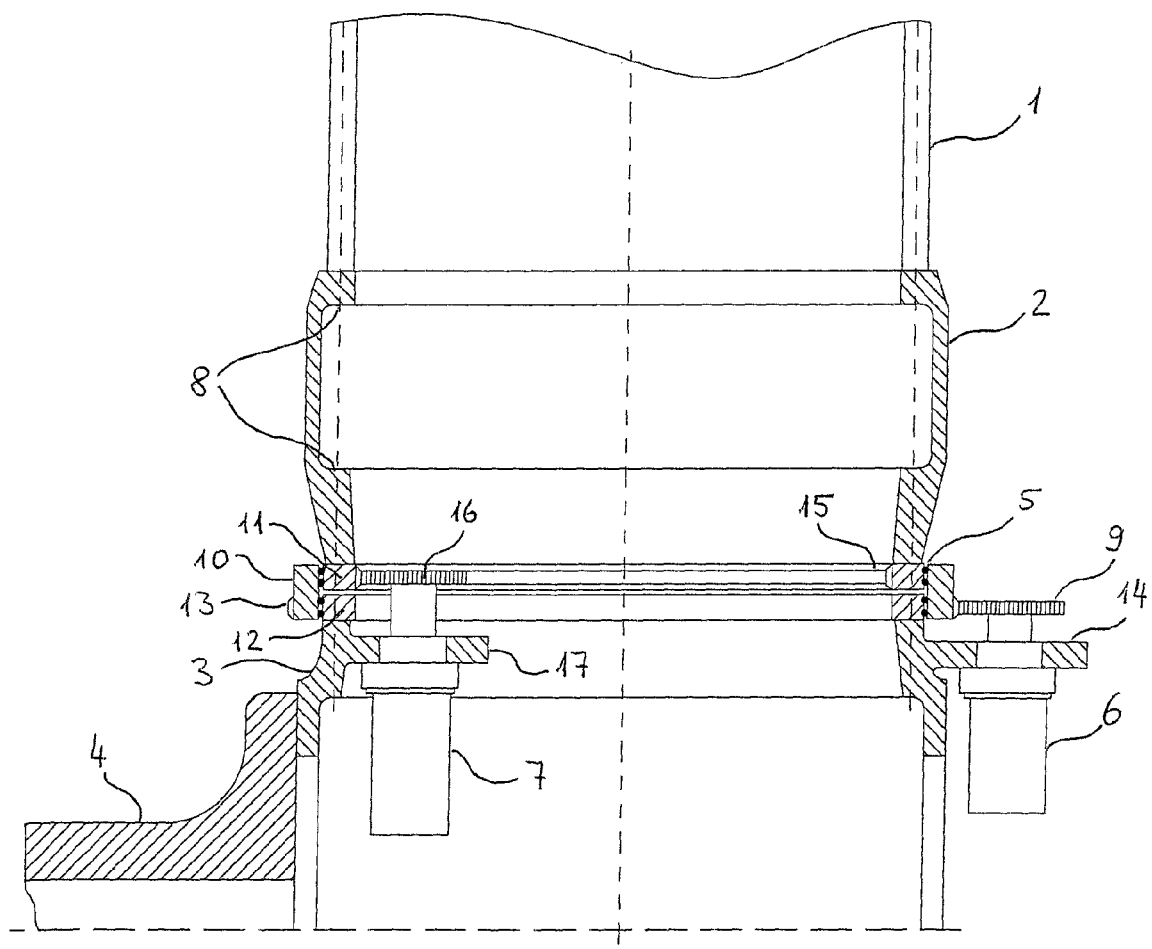

In a preferred aspect of the method, the second drive interacts with the bearing ring and rotates in one direction at a larger or lower speed, for a variation of the setting angle. This aspect has the peculiar advantage that neither the first drive nor the second one needs to change its sense of rotation while the rotor blade is being triggered. For a power control of the wind power plant, conventional pitch systems usually are triggered, starting from the rated power range at the latest, such that the sense of rotation of the driving motor is changed continuously. At this stage, mass inertias require to be overcome in the driving units and the speed has to be passed through a zero cross-over. In the preferred aspect of the method, the first drive rotates the bearing ring at a constant speed. If the second drive rotates at the same speed and in an opposite sense the angular position of the rotor blade remains unchanged. If the second drive increases the speed of its rotational motion now the blade angle is moved in a first sense while if the rotational speed of the second drive is lowered the rotor blade will be moved in the opposite direction. It is unnecessary here to change the sense of rotation for the drives.

Preferably, the sense of rotation of the first drive is chosen so as to set the rotor blade to the feathering position if the second drive fails or undergoes a regulation.

In another preferred aspect of the inventive method, the second drive interacts with the rotor blade or rotor hub and rotates in one or the other sense, for a variation of the setting angle. In this aspect, the second drive is attached to the rotor blade or rotor hub and interacts with the other component each of the pitch system. Here, since the second drive need not compensate the rotational speed as preset by the first drive the setting angle is also varied at a change in the sense of rotation.

In a further preferred aspect of the inventive method, the first drive is operated only after a threshold value is exceeded. The threshold value provided for a load can preferably be a wind speed and/or generator power. Since the breakaway torque substantially is dependent upon the load acting on the bearing the bearing ring will be set into a continuous motion only as long as the breakaway still is readily possible and, hence, the breakaway torque is sufficiently small.

Apart from inducing a continuous rotational motion, it is also possible to determine the speed for the rotary bearing ring in dependence on a load magnitude. Also here, the possible load magnitudes offering themselves are the wind speed and/or generator power.

For reasons of energy saving, it has proved beneficial to choose the speed of the bearing ring so as to be at least sufficiently large to prevent a critical speed between the rotor and bearing ring from falling below a minimum with a breakaway not occurring above the critical minimum speed. To save the power consumed by the first drive, the bearing ring is rotated at a speed which is just large enough to avoid the appearance of a corresponding breakaway torque.

In a preferred aspect of the inventive method, an infinitely variable speed variation is performed on the first and/or second drives. In a further preferred aspect, the setting angle of the rotor blade is regulated via the second drive. For this purpose, a measuring element is provided which measures the angular position of the rotor and transmits the real value to the controller.

For a supervision of the operating condition, the power input of the first drive is monitored. If the power inputted by the first drive turns out to deviate from predetermined values or an interval of predetermined values this is an indication of a fault in the pitch system, especially a fault in the bearing element.

The inventive object is also attained by a device. The device for varying a blade setting angle on a rotor blade of a wind power plant has two variable drives each and a bearing element acting between the rotor blade and rotor hub that has a freely rotatable bearing ring. In the inventive drive, the two drives are joined to the rotor blade or rotor hub, wherein a first drive interacts with the bearing ring as a permanent drive and the second drive interacts with the rotor hub and the rotor blade, respectively. In the inventive device, hence, the first drive is designed as a permanent drive. The second drive, if attached to the rotor blade, interacts with the rotor hub. If the second drive is joined to the rotor hub it interacts with the rotor blade.

The rotor blade usually has a tubular extension, which is also called an extender, on which the bearing element is mounted.

In a possible aspect, the second drive may be disposed within the rotor blade or within the rotor hub. Likewise, the first drive may be disposed outside the rotor blade or outside the rotor hub.

In a preferred aspect, the first and second drives are mounted on the rotor hub wherein the first drive is mounted outside the rotor hub and the second drive is mounted within the rotor hub. The second drive preferably interacts with a bearing element joined to the extender or rotor blade.

BRIEF DESCRIPTION OF THE SEVERAL VIEWS OF THE DRAWINGS

Figure 2:
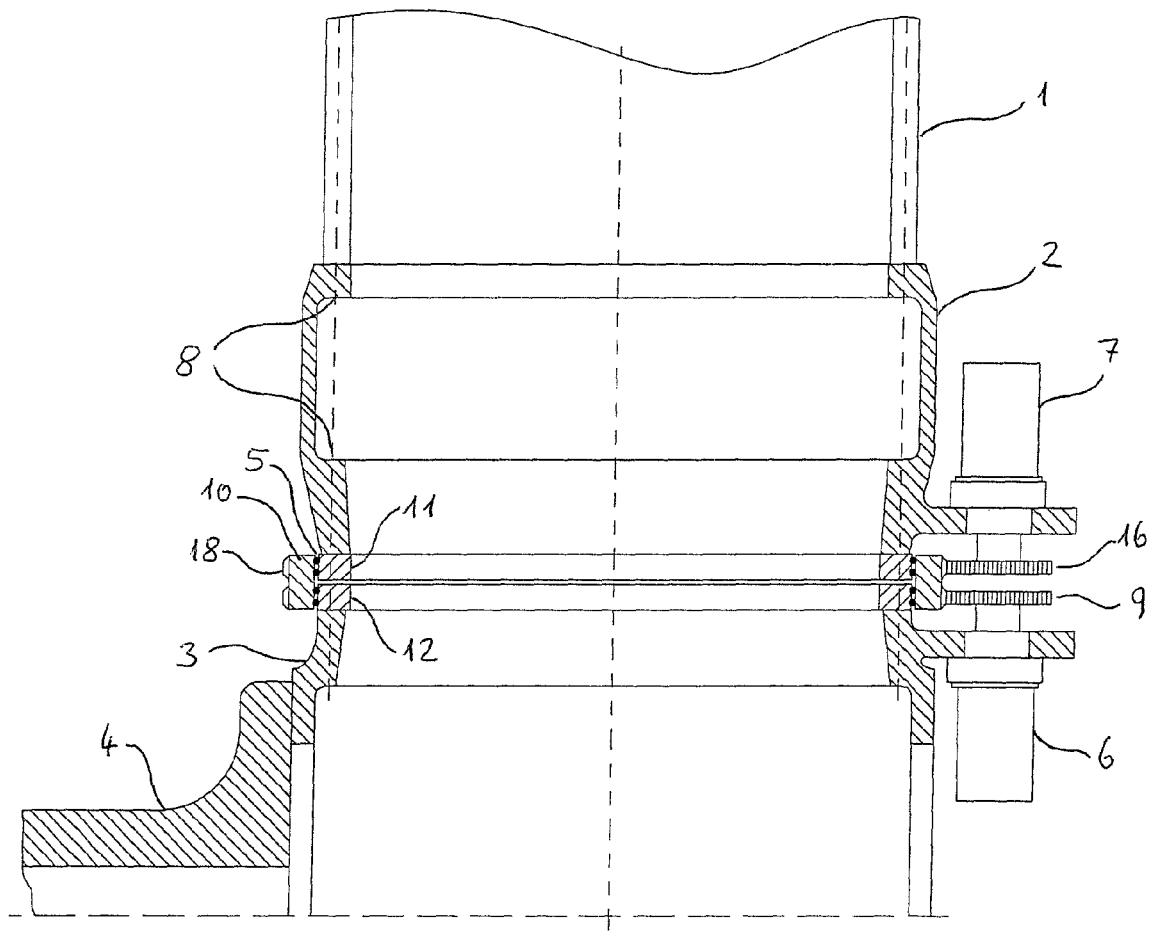
Figure 3:
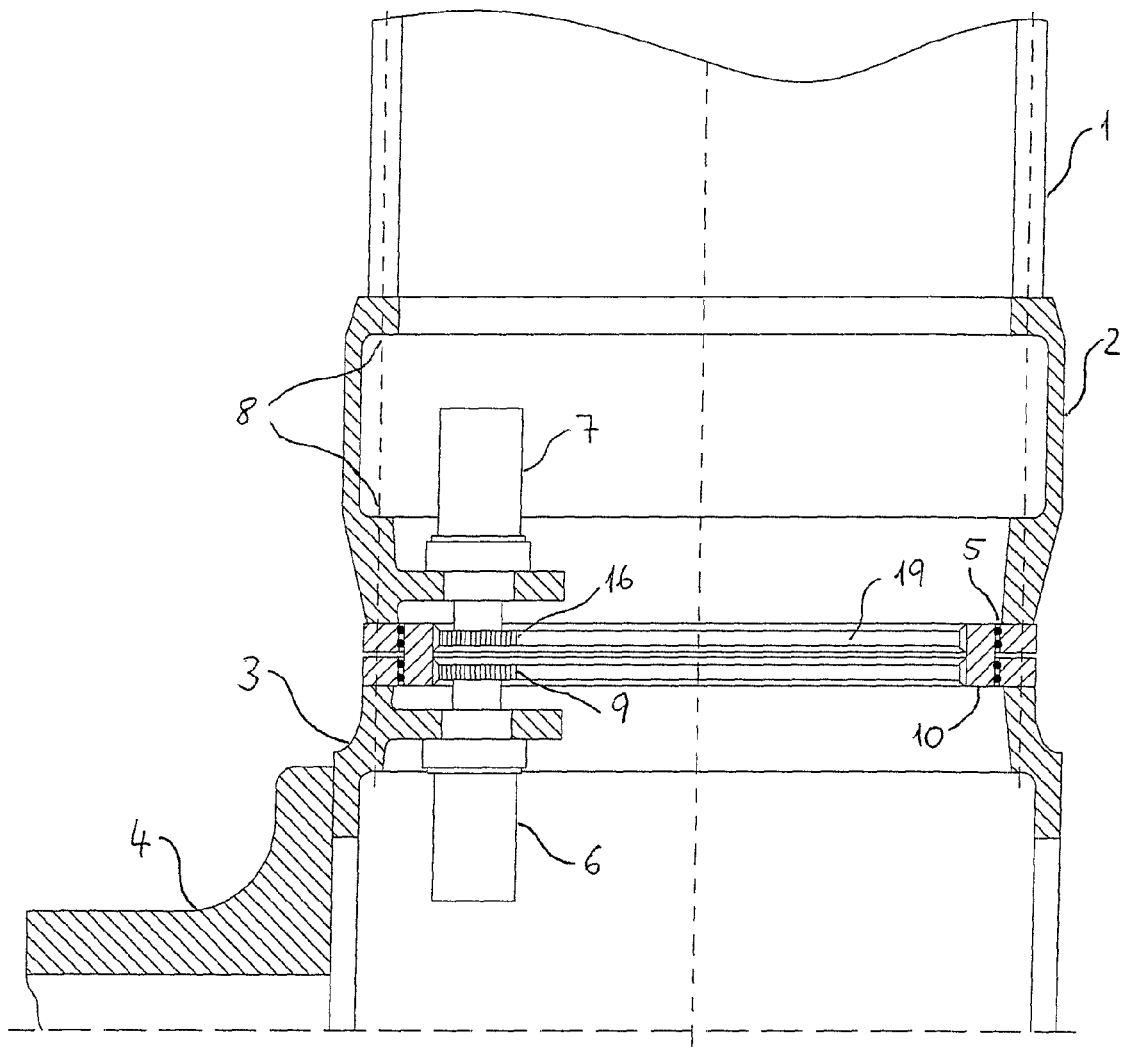

The invention will be described in more detail with reference to the figures which follow. In the figures, FIG. 1 shows the inventive pitch system including two drives attached to the rotor hub, FIG. 2 shows an alternative aspect of the pitch system including two externally located drives, and FIG. 3 shows a further aspect of the pitch system including internally located drives.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated The components required for a variation of the rotor blades are technically referred to as a pitch system in their entity. Accordingly, the blade setting drives are designated as pitch drives below.

FIG. 1 shows some portion of a rotor blade 1 which is disposed on a tubular extension 2 (extender). The rotor blade 1 is joined to the extender 2 via bolts 8, for example. For a description of the invention, the extender is regarded as a component of the rotor blade for simplicity. The rotor blade 1 and extender 2 are rotatably supported by the rotor hub 3. The rotor hub 3 is joined to a rotor shaft 4 which passes the force applied to the rotor blade 1 on to a generator unit.

An antifriction bearing 5 which has a freely rotatable bearing ring 10 is provided between the rotor hub 3 and extender 2. The freely rotatable bearing ring 10 may be called an annular element, outer ring or bearing race. The freely rotatable bearing ring 10 is movably supported with respect to the bearing rings 11 and 12 via rolling members. The bearing rings 11 and 12 are joined each to the extender 2 and rotor hub 3, respectively, e.g. via a pinned joint. In the example shown, bearing members arranged by pairs each are provided between the bearing rings 11 and 12 and the freely rotatable bearing ring 10.

It is understood that any other structure may be chosen for the antifriction bearing as well. For example, it is possible to configure the rotary bearing ring as being split and a spacer ring may be disposed (as an extender) between the parts.

At its outside, the freely rotatable bearing ring 10 has a tooth system 13 with which a pinion 9 of the first drive 6 meshes. The first drive 6 is fixed for rotation to the outside of the rotor hub 3 via a support 14.

The bearing ring 11 joined to the extender 2 has its inside fitted with a tooth system 15 with which a pinion 16 of the second drive 7 meshes. The second drive 7 is fixedly retained for rotation in the rotor hub 3 via a support 17.

The pitch system of FIG. 1 is triggered in such a way that the drive 6 causes the rotary bearing ring 10 to continuously rotate via the pinion 9. The rotational speed is so large that a breakaway torque does not occur even if the extender 2 rotates with the rotor blade 1. To this end, it is necessary for the relative speed between the ring 11 and the rotary bearing ring 10 to exceed a critical speed even if the extender 2 rotates in the sense of rotation of the bearing ring 10.

The arrangement of the bearing and pitch drives as illustrated in FIG. 1 differs from the arrangement known from DE 101 40 793 A1 in that one pitch drive interacts directly with the rotor blade to be varied in its setting whereas the known pitch systems which have two drives will always act jointly on the bearing elements.

FIGS. 2 and 3 show alternative aspects of the pitch system in which the drives engage the rotary bearing ring 10 jointly.

In FIG. 2, the rotary bearing ring 10 is disposed outside the bearing rings 11 and 12. At its outside, the bearing ring 10 has a tooth system 18 in which the pinions 9 and 16 mesh. The tooth system 18 may be formed as a continuous tooth system here or may consist of two parallel tooth series as is suggested in FIG. 2.

If the drives 6 and 7 are positioned at an offset a tooth system having the width of a pinion will be sufficient, i.e. the pinions 9 and 16 of the two drives 6, 7 run in the same tooth system 18.

When in operation, the drives 6 and 7 will run permanently to set the bearing ring 10 into a rotational motion. The two drives rotate at the same speed, provided that there is the same speed ratio for either drive, and in an opposed sense of rotation. This does not vary the rotor blade 1 in its angular position. If the rotation of the rotor blade is to take place now the drive 7 will rotate at a speed which is larger or smaller than the one for maintaining the angular position. This does vary the rotor blade 1 in its angular position.

FIG. 3 shows an alternative aspect where the freely rotatable bearing ring 10 is supported by the inside and has a pair of parallel-extending teeth 19 at its inside. The pinions 9 and 16 permanently rotate the freely rotatable bearing ring 10 as they do in the aspect of FIG. 2 already.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method for operating a device to vary a blade setting angle on a rotor blade of a wind power plant, comprising a first variable drive (6) and a second variable drive (7) per rotor blade, a bearing element (5) acting between the rotor blade and a rotor hub which has a freely rotatable bearing ring (10), wherein the method comprises initiating a permanent rotation of the bearing ring (10) by the first variable drive (6), and adjusting the setting angle of the rotor blade by the second variable drive (7), characterized in that the first variable drive (6) initiates the permanent rotation of the bearing ring (10) only after a predetermined threshold value for a load is exceeded.

2. The method according to claim 1, characterized in that the second drive (7) rotates in an opposite direction than the first drive (6), for a variation of the setting angle.

3. The method according to claim 2, characterized in that rotation of the first drive (6) and the second drive (7) at a same speed does not vary the setting angle on a rotor blade.

4. The method according to claim 1, characterized in that at least one of a wind speed and a generator power is provided as the predetermined threshold value for the load.

5. The method according to claim 1, characterized in that the setting angle is regulated via a speed of the second drive being smaller or greater than a speed that maintains the setting angle.

6. The method according to claim 1, characterized in that the freely rotatable bearing ring (10) has a first surface that forms an outside surface of the bearing element (5) and each of the first and second drives (6, 7) are engaged to the first surface of the bearing ring (10).

7. The method according to claim 1, characterized in that the free rotatable bearing ring (10) has a first surface that forms an inside surface of the bearing element (5), and each of the first and second drives (6, 7) are engaged to the first surface of the bearing ring (10).

8. A method for operating a device to vary a blade setting angle on a rotor blade of a wind power plant, comprising a first variable drive (6) and a second variable drive (7) per rotor blade, a bearing element (5) acting between the rotor blade and a rotor hub which has a freely rotatable bearing ring (10), wherein the method comprises initiating a permanent rotation of the bearing ring (10) by the first variable drive (6), and adjusting the setting angle of the rotor blade by the second variable drive (7), characterized in that a speed for the bearing ring (10) is determined depending on a predetermined threshold value for a load magnitude.

9. The method according to claim 8, characterized in that at least one of a wind speed and a generator power is provided as the threshold value for the load magnitude.

10. The method according to claim 8, characterized in that the speed of the bearing ring is at least so large that the speed between the rotor blade and bearing ring does not fall below a critical minimum, preventing a breakaway torque from occurring on the bearing element above the critical minimum speed.

11. The method according to claim 10, characterized in that the speed of the bearing ring prevents breakaway torque, thereby keeping the occurring energy consumption as small as possible.

12. A device for varying a blade setting angle on a rotor of a wind power plant, comprising two variable drives each (6, 7) per rotor blade and a bearing element provided between the rotor blade (1) and rotor hub (3) that has a freely rotatable bearing ring (10), characterized in that the two variable drives (6, 7) are both retained either on the rotor blade (1) or rotor hub (3), wherein a first drive (6) permanently drives the bearing ring (10) and the second drive (7) interacts with the rotor blade (1) and the rotor hub (3), respectively.

13. The device according to claim 12, characterized in that the rotor blade (1) has a tubular extension (2) joined to the bearing element.

14. The device according to claim 13, characterized in that the second drive (7) is disposed within the rotor blade (1), the tubular extension (2) or the rotor hub (3).

15. The device according to claim 13, characterized in that the first drive (6) is disposed outside the rotor blade (1), the tubular extension (2) or the rotor hub (3).

16. The device according to claim 12, characterized in that the first and second drives (6, 7) are mounted on the rotor hub (3).

17. The device according to claim 16, characterized in that the second drive (7) interacts with a bearing element (11) joined to the rotor blade (1).

* * * * *